US009738234B2

(12) United States Patent
Lien

(10) Patent No.: US 9,738,234 B2
(45) Date of Patent: Aug. 22, 2017

(54) FASTENING APPARATUS

(71) Applicant: ScienBizip Consulting (ShenZhen) Co., Ltd., Shenzhen (CN)

(72) Inventor: Yu-Tan Lien, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 14/857,038

(22) Filed: Sep. 17, 2015

(65) Prior Publication Data

US 2017/0080875 A1     Mar. 23, 2017

(51) Int. Cl.
| | |
|---|---|
| A47G 29/00 | (2006.01) |
| B60R 11/02 | (2006.01) |
| E05D 5/12 | (2006.01) |
| E05D 7/12 | (2006.01) |
| B60R 11/00 | (2006.01) |

(52) U.S. Cl.
CPC .............. *B60R 11/02* (2013.01); *E05D 5/128* (2013.01); *E05D 7/121* (2013.01); *B60R 2011/0057* (2013.01); *B60R 2011/0085* (2013.01)

(58) Field of Classification Search
CPC .......................... F16M 11/10; B60R 2011/007
USPC .................... 248/683, 205.3, 291.1, 309.4
See application file for complete search history.

(56) References Cited

U.S. PATENT DOCUMENTS

| | | | | |
|---|---|---|---|---|
| 3,410,602 A | * | 11/1968 | Schuler ................. | B60J 3/0208<br>248/683 |
| 7,374,142 B2 | * | 5/2008 | Carnevali ............. | F16M 13/00<br>224/183 |
| 8,899,537 B2 | * | 12/2014 | Kuan ................. | F16M 11/2021<br>16/319 |
| 9,388,933 B2 | * | 7/2016 | Zhang .................... | F16M 11/10 |
| 2005/0121579 A1 | * | 6/2005 | Rim ..................... | B60R 11/0235<br>248/288.11 |
| 2012/0062691 A1 | * | 3/2012 | Fowler ................... | F16M 11/10<br>348/36 |
| 2012/0273630 A1 | * | 11/2012 | Gillespie-Brown . | F16M 11/041<br>248/122.1 |
| 2012/0273637 A1 | * | 11/2012 | Huang ................. | F16M 11/041<br>248/291.1 |
| 2014/0151525 A1 | * | 6/2014 | Cheng .................... | A45D 42/16<br>248/467 |
| 2014/0265765 A1 | * | 9/2014 | Khodapanah .......... | F16M 13/02<br>312/223.1 |
| 2016/0023617 A1 | * | 1/2016 | Chow ..................... | B60R 11/02<br>248/286.1 |
| 2016/0102805 A1 | * | 4/2016 | Khodapanah .......... | F16M 13/02<br>248/224.8 |

(Continued)

*Primary Examiner* — Bradley Duckworth
(74) *Attorney, Agent, or Firm* — Steven Reiss

(57) ABSTRACT

A fastening apparatus is configured to fasten an electronic device to other objects. The fastening apparatus includes a fastening base, a connection assembly pivotably connected to the fastening base, a first magnet, and an adhesive layer positioned on the fastening base configured to fix the fastening base to other objects. The connection assembly includes a connection portion and a second hinge positioned on the connection portion. The first magnet is positioned on a side of the connection portion to detachably grip the electronic device, and the second hinge is positioned on other side of the connection portion opposite to the first magnet. The second hinge is pivotably connected to the fastening base.

6 Claims, 5 Drawing Sheets

(56) References Cited

U.S. PATENT DOCUMENTS

2016/0161052 A1* 6/2016 Griggs .................. F16M 11/24
   320/108
2016/0318455 A1* 11/2016 Zhang .................. F16M 11/105

* cited by examiner

FASTENING APPARATUS

FIELD

The subject matter herein generally relates to fastening apparatuses for fastening electronic devices in vehicles.

BACKGROUND

A suction cup or clip is usually used as a fastening mechanism of automobile data recorders and other electronic devices in a vehicle. Meanwhile, the automobile data recorder is fastened to the vehicle by combining the fastening mechanism with a rotating assembly.

BRIEF DESCRIPTION OF THE DRAWINGS

Implementations of the present technology will now be described, by way of example only, with reference to the attached figures.

DETAILED DESCRIPTION

Figure 1:
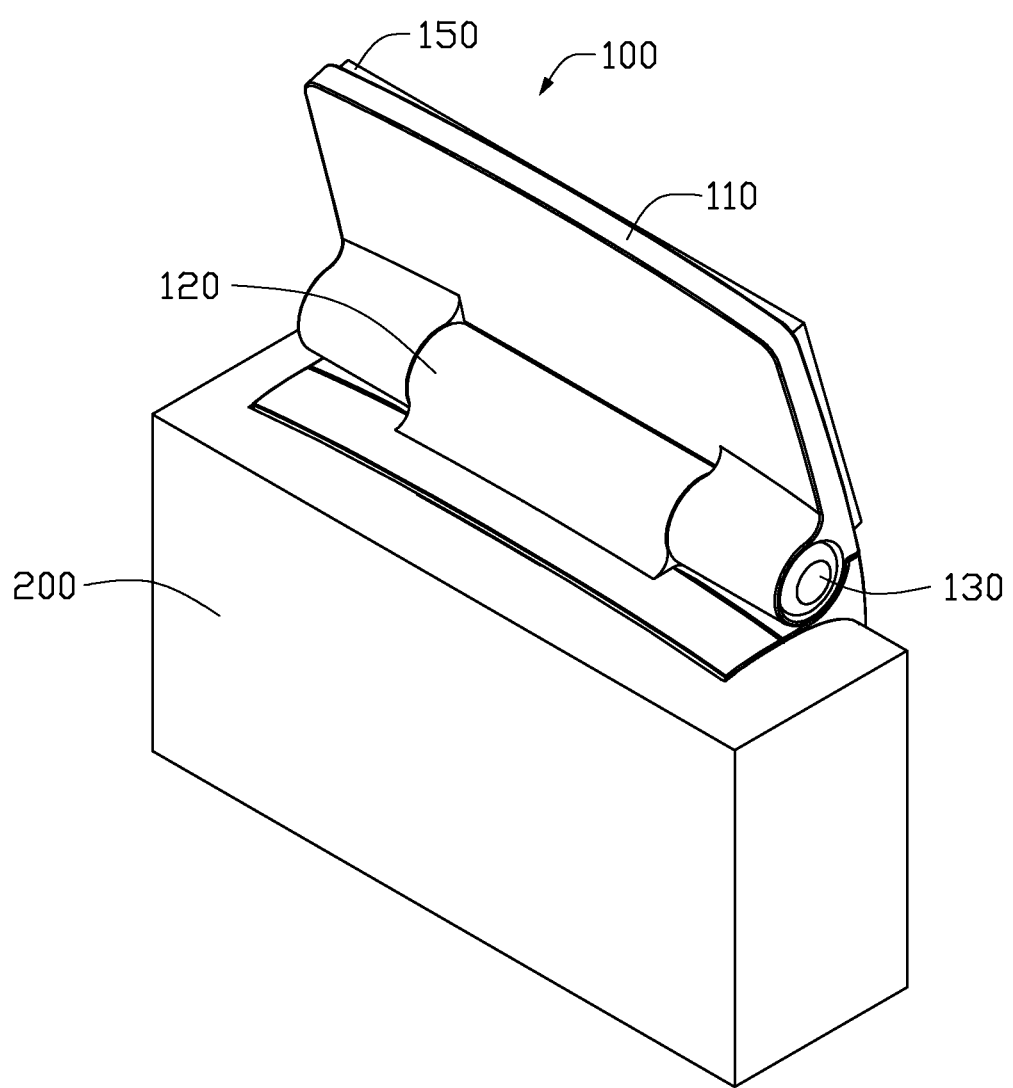
FIG. 1 is an isometric view of an embodiment of a fastening apparatus and an electronic device, the fastening apparatus including a fastening base.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to", it specifically indicates open-ended inclusion or membership in the so-described combination, group, series and the like.

The present disclosure is described in relation to a fastening apparatus.

Figure 2:
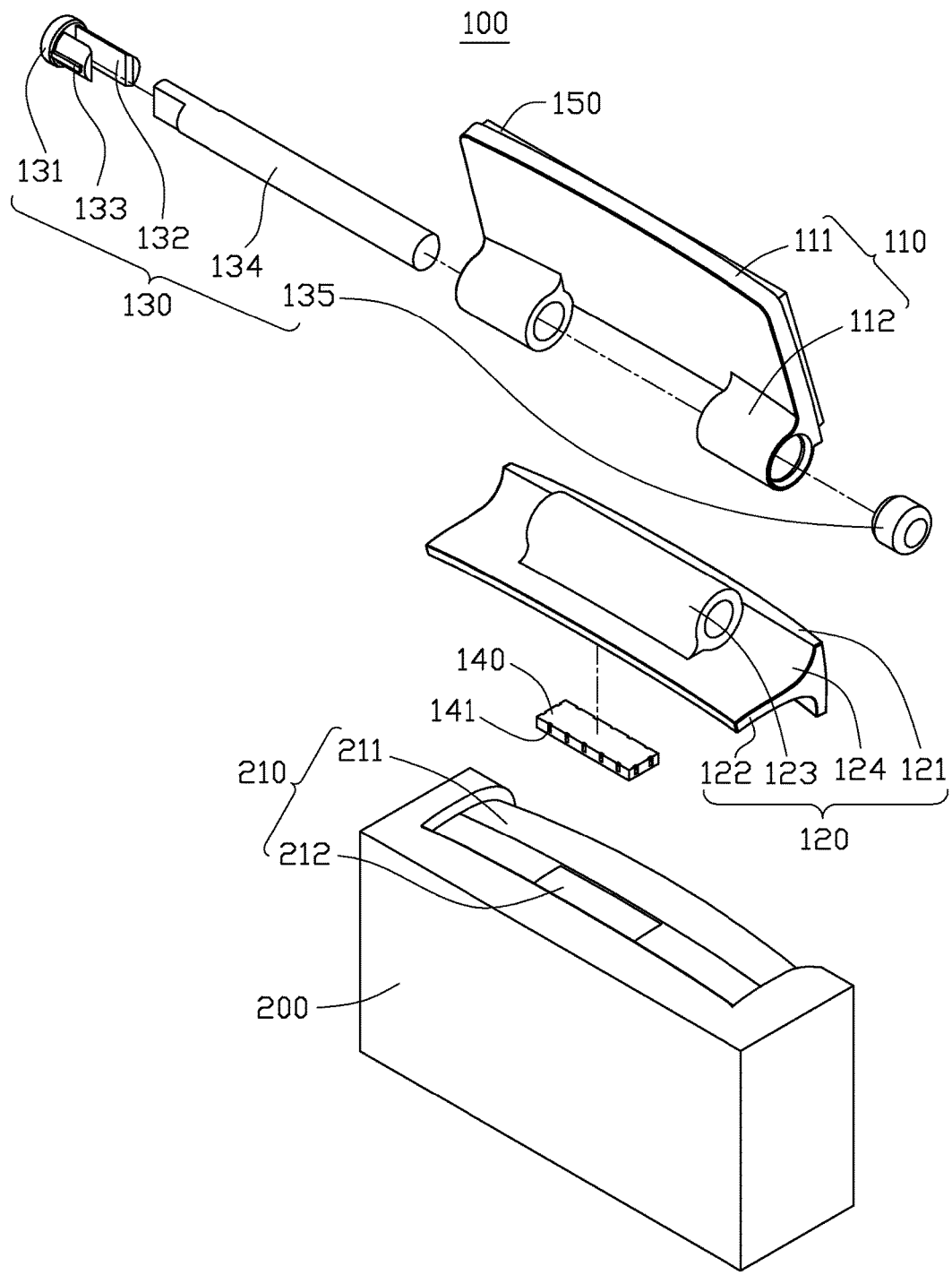
FIG. 2 is an exploded, isometric view of the fastening apparatus and the electronic device of FIG. 1, the fastening apparatus including a connection assembly and a first magnet.

FIG. 1 illustrates an embodiment of a fastening apparatus 100 configured to fasten an electronic device 200, such as an automobile data recorder, to a vehicle (not shown in FIG. 1). The fastening apparatus 100 can include a fastening base 110, a connection assembly 120 pivotably connected to the fastening base 110, a pivot assembly 130, a first magnet 140 (as shown in FIG. 2) positioned on the connection assembly 120, and an adhesive layer 150 disposed on the fastening base 110. A plurality of latching holes 141 can be defined in a sidewall of the first magnet 140. The adhesive layer 150 can fasten the fastening base 110 to other objects (not shown in FIG. 1), such as a windshield of a vehicle, etc. In the illustrated embodiment, the adhesive layer 150 can be a double-sided tape, such as a 3M adhesive tape, etc.

FIG. 2 illustrates that a receiving groove 210 can be defined in a side of the electronic device 200. The receiving groove 200 can include a bottom surface 211 and a second magnet 212 positioned on the bottom surface 211. In the illustrated embodiment, the first magnet 140 and the second magnet 212 can be a neodymium magnet.

Figure 3:
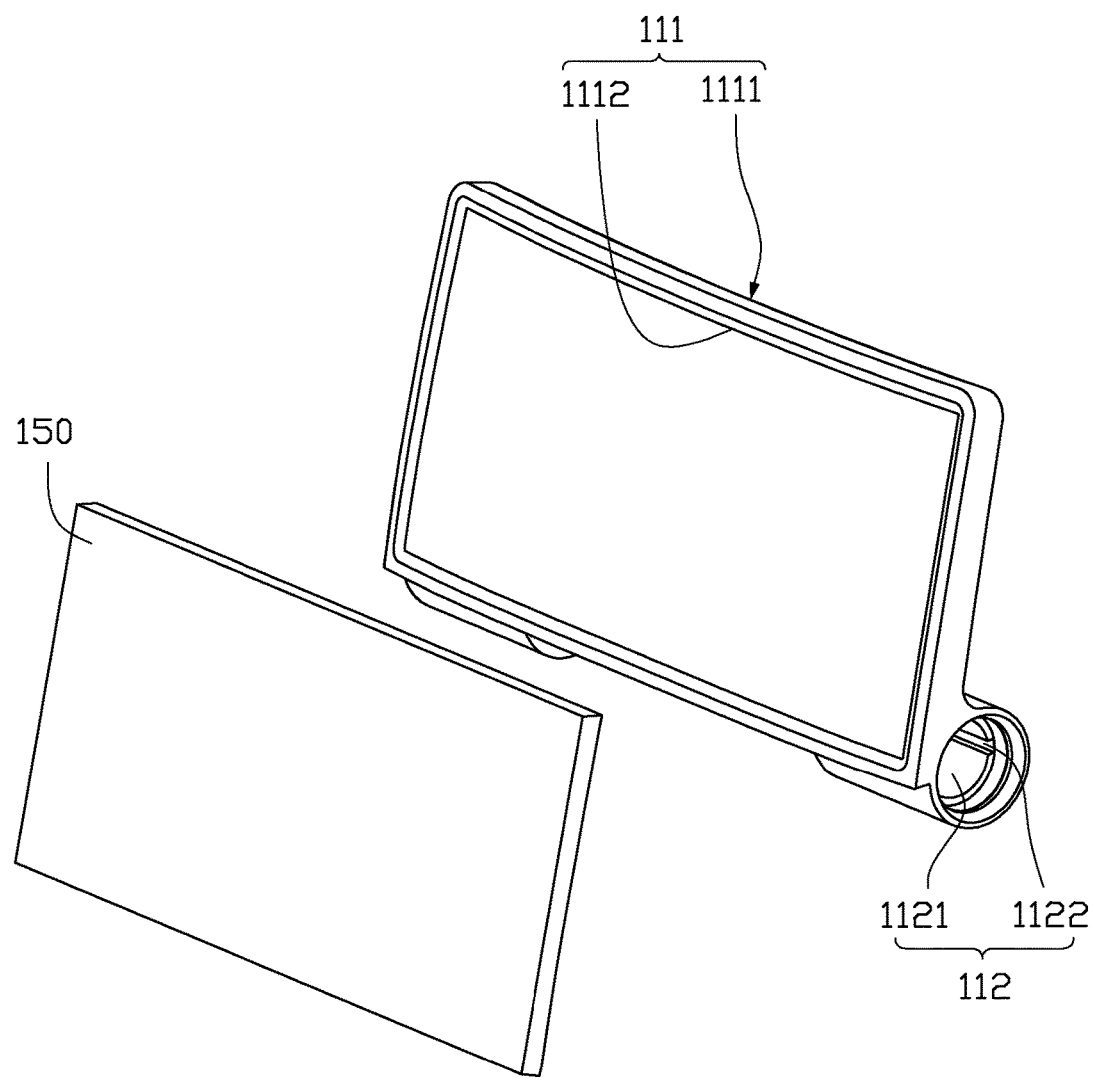
FIG. 3 is an isometric view of the fastening base of the fastening apparatus of FIG. 1.

FIG. 3 illustrates that the fastening base 110 can include a main body 111 and at least one first hinge 112 positioned on the main body 111. The main body 111 can include a first surface 1111 and a second surface 1112 opposite to the first surface 1111. The at least one first hinge 112 can be positioned on a side of the first surface 1111. The adhesive layer 150 can be positioned on the second surface 1112. In the illustrated embodiment, a number of the at least one first hinge 112 can be two. A hole 1121 and at least one slot 1122 can be defined in one of the first hinges 112. The at least one slot 1122 can be defined in an inner surface of the hole 1121. Another first hinge 112 can only include the hole 1121. The hole 1121 can pass through opposite ends of each first hinge 112. A number of the at least one slot 1122 can be two.

Figure 4:
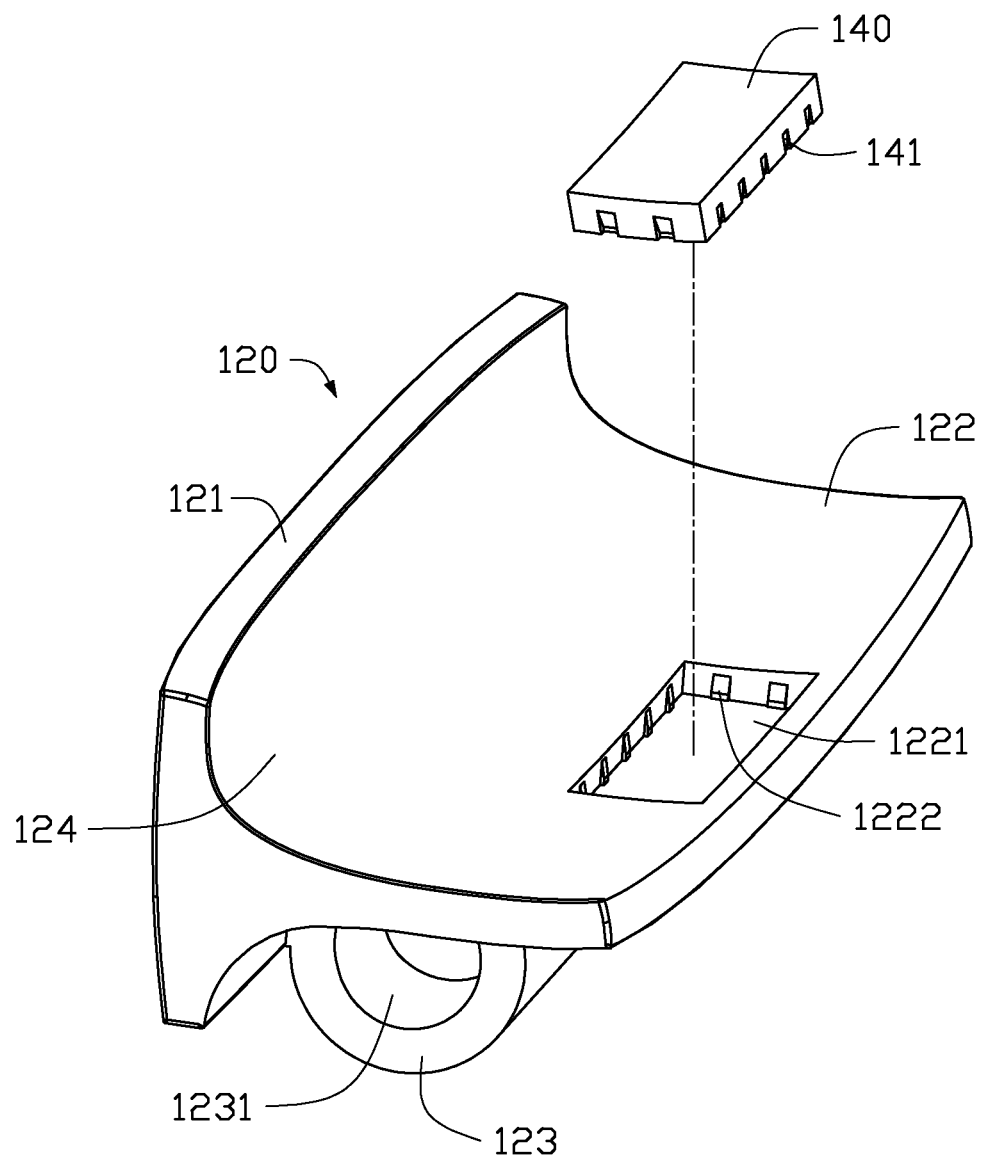
FIG. 4 is an isometric view of the connection assembly and the first magnet of the fastening apparatus of FIG. 2.

FIG. 4 illustrates that the connection assembly 120 can include a baffle 121, a connection portion 122, and a second hinge 123. The baffle 121 can be configured to limit a rotating angle of the electronic device 200 relative to the fastening base 110 (as shown in FIG. 1). The connection portion 122 can protrude out from a side of the baffle 121, and can be substantially perpendicular to the baffle 121. A curved surface 124 can be formed between the connection portion 122 and the baffle 121. A groove 1221 can be defined in a side of the connection portion 122 away from the fastening base 110 (as shown in FIG. 2). The connection portion 122 can include a plurality of protrusions 1222 positioned on an inner sidewall of the groove 1221. A shape of the groove 1121 can be matched with a shape of the first magnet 140 to be able to receive the first magnet 140. In the illustrated embodiment, a shape of each protrusion 1222 is a trapezoid. The protrusions 1222 can be coupled with the latching holes 141 of the first magnet 140 fastening the first magnet 140 into the groove 1221. The second hinge 123 can be positioned on an opposite side of the connection portion 122 facing the fastening base 110. The second hinge 123 can be positioned between the two first hinges 112 (as shown in FIG. 2). A through hole 1231 can be defined in the second hinge 123 and can pass through opposite ends of the second hinge 123. The pivot assembly 130 can pass through the through hole 1231 and the hole 1121, such that the connection assembly 120 can be pivotably connected to the fastening base 110 (as shown in FIG. 2).

Figure 5:
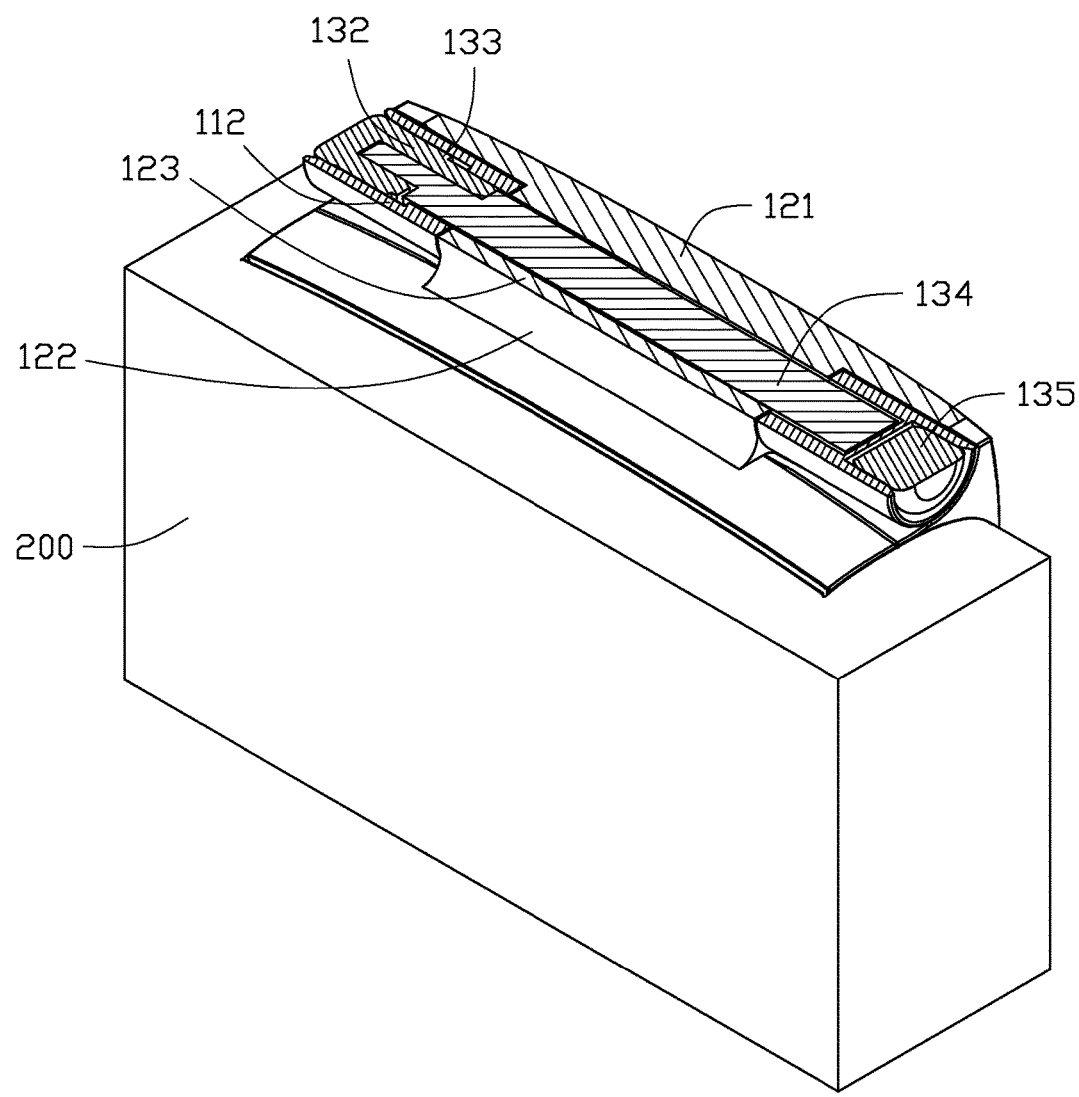
FIG. 5 is a cross-sectional view of the fastening base and the connection assembly of the fastening apparatus of FIG. 1.

FIG. 2 and FIG. 5 illustrate that the pivot assembly 130 can include a first cover 131, a clamping member 132 positioned on the first cover 131, at least one baffle bar 133 positioned on the clamping member 132, a pivot 134, and a second cover 135. The clamping member 132 can be configured to clamp an end of the pivot 134. The pivot 134 can pass through the through hole 1231 (as shown in FIG. 4) and the hole 1121 (as shown in FIG. 3) to pivotably connect the connection assembly 120 to the fastening base 110. The at least one baffle bar 133 can be received in the slot 1122 (as shown in FIG. 3) to avoid a rotation of the clamping member 132 relative to the first hinge 112. The first cover 131 and the second cover 135 can be configured to respectively cover the each first hinge 112.

In assembly, the adhesive layer 150 can be pasted to the second surface 1112 of the fastening base 110. The second hinge 123 of the connection assembly 120 can be positioned between the two first hinges 112 of the fastening base 110. One end of the pivot 134 can be clamped by the clamping member 132 of the pivot assembly 130. An opposite end of the pivot 134 can pass through the hole 1121 and the through hole 1231. Meanwhile, the baffle bar 133 can be received in the slot 1122. The first cover 131 can cover an end of one of the two first hinges 112, and the second cover 135 can cover an end of the other one of the two first hinges 112. The first magnet 140 can be received in the groove 1221 of the connection portion 122, and the protrusions 1222 of the connection portion 122 can be coupled with the latching hole 141 of the first magnet 140.

In use, the fastening apparatus 100 can be fastened to other objects, such as the windshield of the vehicle, etc. The connection portion 122 can be received in the receiving groove 210 of the electronic device 200 and can be attached to the bottom surface 211 of the receiving groove 210 by a magnetic force of the first magnet 140 and the second magnet 212, and parts of the baffle 121 can be received in the receiving groove 210. Therefore, the electronic device 200 can be fastened to the fastening apparatus 100. The electronic device 200 can be rotated around the pivot assembly 130 adjusting an angle of the electronic device 200 relative to the fastening base 110. The electronic device 200 can be removed from the fastening apparatus 100 by overcoming the magnetic force of the first magnet 140 and the second magnet 212.

In at least one embodiment, the connection assembly 120 can be directly pivotably connected to the fastening base 110 by other fastening members (not shown in FIG. 2), such as screws.

In at least one embodiment, the first hinge 112 can be removed, and the connection assembly 120 can be directly pivotably connected to the fastening base 110.

In at least one embodiment, the connection portion 122 can be removed, and the first magnet 140 can be directly connected to the second hinge 123.

In at least one embodiment, the clamping member 132 and the pivot 134 can be a unibody.

In at least one embodiment, either of the first magnet 140 and the second magnet 212 can be replaced by an iron block.

As described above, the fastening apparatus 100 can be directly fastened to other objects by the fastening base 110 and the adhesive layer 150. The electronic device 200 can be pivotably connected to the fastening base 110 by the connection assembly 120 to adjust the angle of the electronic device 200 relative to the fastening base 110. Meanwhile, the electronic device 200 can be removably connected to the connection assembly 120 by the magnetic force of the first magnet 140 and the second magnet 212.

The embodiments shown and described above are only examples. Many details are often found in the art such as the other features of a fastening apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A fastening apparatus configured to fasten an electronic device to other objects, the fastening apparatus comprising:
   a fastening base;
   a connection assembly pivotably connected to the fastening base, the connection assembly comprising a connection portion and a second hinge positioned on the connection portion;
   a first magnet positioned on the connection assembly and configured to detachably grip the electronic device;
   an adhesive layer positioned on the fastening base configured to fix the fastening base to other objects;
   wherein the first magnet is positioned on a side of the connection portion, the second hinge is positioned on the other side of the connection portion opposite to the first magnet, and the second hinge is pivotably connected to the fastening base; and
   wherein the connection portion comprises a groove, the groove is defined in a side of the connection portion and is configured to receive the first magnet, the connection portion comprises a plurality of protrusions positioned on an inner sidewall of the groove, a plurality of latching holes are defined in a sidewall of the first magnet, and the protrusions are couplable with the latching holes.

2. The fastening apparatus as claimed in claim 1, wherein the fastening base comprises a main body comprising a first surface and a second surface opposite to the first surface, at least one first hinge positioned on a side of the first surface, the adhesive layer is fixed on the second surface, and the second hinge is pivotably connected to the at least one first hinge.

3. The fastening apparatus as claimed in claim 2, wherein the fastening apparatus further comprises a pivot assembly comprising a pivot, the each first hinge defines a hole, the second hinge defines a through hole, and the pivot passes through the hole and the through hole.

4. The fastening apparatus as claimed in claim 3, wherein the pivot assembly further comprises a clamping member and at least one baffle bar positioned on the clamping member, at least one slot is defined in an inner surface of the hole, the clamping member is configured to clamp an end of the pivot, and the at least one baffle bar is received in the at least one slot to avoid a rotation of the clamping member relative to the each first hinge.

5. The fastening apparatus as claimed in claim 4, wherein the pivot assembly further comprises a first cover and a second cover, the clamping member is positioned on the first cover, and the first cover and the second cover respectively cover an end of the each first hinge.

6. The fastening apparatus as claimed in claim 1, wherein the connection assembly further comprises a baffle, the connection portion protrudes out from a side of the baffle, the baffle is configured to limit a rotating angle of the electronic device relative to the fastening base, and a curved surface is formed between the connection portion and the baffle.

<div style="text-align:center">* * * * *</div>